United States Patent [19]

Sugiura et al.

[11] Patent Number: 5,051,105
[45] Date of Patent: Sep. 24, 1991

[54] RESIN RACK BOOT

[75] Inventors: Hidemi Sugiura, Aichi; Mikio Ukai, Nagoya, both of Japan

[73] Assignee: Toyoda Gosei Co., Ltd., Nishikasugai, Japan

[21] Appl. No.: 536,068

[22] Filed: Jun. 11, 1990

Related U.S. Application Data

[63] Continuation of Ser. No. 111,877, Oct. 23, 1987, abandoned.

[30] Foreign Application Priority Data

Dec. 27, 1986 [JP] Japan .................. 61-199698

[51] Int. Cl.$^5$ ............................................. F16D 3/84
[52] U.S. Cl. ................................. 464/175; 74/18.2; 277/212 FB
[58] Field of Search ............ 464/175; 74/18, 18.1, 74/18.2; 403/50; 277/212 FB

[56] References Cited

U.S. PATENT DOCUMENTS

| | | | |
|---|---|---|---|
| 3,490,343 | 1/1970 | Afanador et al. | 74/18.2 X |
| 4,058,018 | 11/1977 | Lauper | 74/18.2 |
| 4,083,202 | 4/1978 | Westercamp | 464/175 X |
| 4,639,159 | 1/1987 | Amrath | 74/18.2 X |
| 4,721,175 | 1/1988 | Butler | 403/50 X |
| 4,722,415 | 2/1988 | Takahashi | 277/212 FB X |

FOREIGN PATENT DOCUMENTS

| | | | |
|---|---|---|---|
| 956804 | 10/1974 | Canada | 464/175 |
| 2125117 | 12/1972 | Fed. Rep. of Germany | 74/18.2 |
| 156777 | 9/1983 | Japan | 277/212 FB |
| 61-160673 | 7/1986 | Japan . | |

Primary Examiner—Daniel P. Stodola
Assistant Examiner—William G. Battista, Jr.
Attorney, Agent, or Firm—Cushman, Darby & Cushman

[57] ABSTRACT

A rack boot which is installed at the steering rack portion of an automobile comprises a small-diameter ring portion, a large-diameter ring portion, and a bellows portion interposed between the small-diameter portion and the large-diameter portion. An angle to an axial line of the boot of a slanted wall of a first crest in the bellows portion is arranged to be 70° to 85°, whereby the slanted wall is turned in when the boot contracts to an extreme extent. As a result, the shrinkage ratio of the boot in the axial direction can be increased without any necessity to enlarge the outer diameter of the crest portion of the boot or to increase the number of crests. Consequently, the size of the rack boot can be reduced.

1 Claim, 2 Drawing Sheets

RESIN RACK BOOT

This is a continuation of application Ser. No. 07/111,877, filed Oct. 23, 1987, which was abandoned upon the filing hereof.

BACKGROUND OF THE INVENTION

This invention relates to a resin rack boot having a small-diameter ring portion, a large-diameter ring portion, and a bellows portion disposed therebetween, and which is installed at the steering rack portion of an automobile.

This invention particularly relates to a resin rack booth which is preferably installed for a steering rack with a long rack stroke.

A conventional rack boot as shown in FIG. 1 has a small-diameter ring portion 11 which is fitted to an outer fitting groove 1a in a ball joint shaft 1, and a larger-diameter ring portion 13 which is fitted to an outer fitting groove 4a in a rack housing 4. The rack boot further comprises a bellows portion 15 which disposed between the two ring portions 11 and 13. The angle 2 and an axial line of a slanted wall 15a of the first crest portion M1 which is closest to the small-diameter ring portion 11 in the bellows portion 15 is 40° to 60°.

In general, as resin has smaller elongation ratio and less flexibility than that of rubber, it is difficult to get high elongated length/contracted length ratio in the axial direction of a boot with a resin boot as compared with a rubber boot. However, the rack stroke of a vehicle's steering tends to be larger in recent times in order to improve the steering ability and to reduce the size of a steering device. In order to meet this demand for an increase in the rack stroke, either enlargement of the outer diameter of the crest portion of the bellows portion or increase of the number of crests can be adopted. However, the former solution is not desirable from the viewpoint of optimum utilization of space adjacent to the steering rack portion. The latter solution is not desirable because the length of the boot when it contracts to an extreme extent thereof becomes too great.

SUMMARY OF THE INVENTION

A rack boot according to the present invention installed at the steering rack portion of an automobile comprises a small-diameter ring portion, a large-diameter ring portion, and a bellows portion interposed between the small-diameter ring portion and the large-diameter ring portion. The angle of the slanted surface of a first crest which is closest to the small-diameter ring portion in the bellows portion is arranged to be 70° to 85°, whereby the slanted wall is turned in when the booth contracts to an extreme extent. As a result, the shrinkage ratio of the boot i the axial direction can be increased without any necessity to enlarge the outer diameter of the crest portion of the boot or increase the number of crests. Consequently, the size of the rack boot can be reduced.

DESCRIPTION OF THE PREFERRED EMBODIMENT

Figure 1:
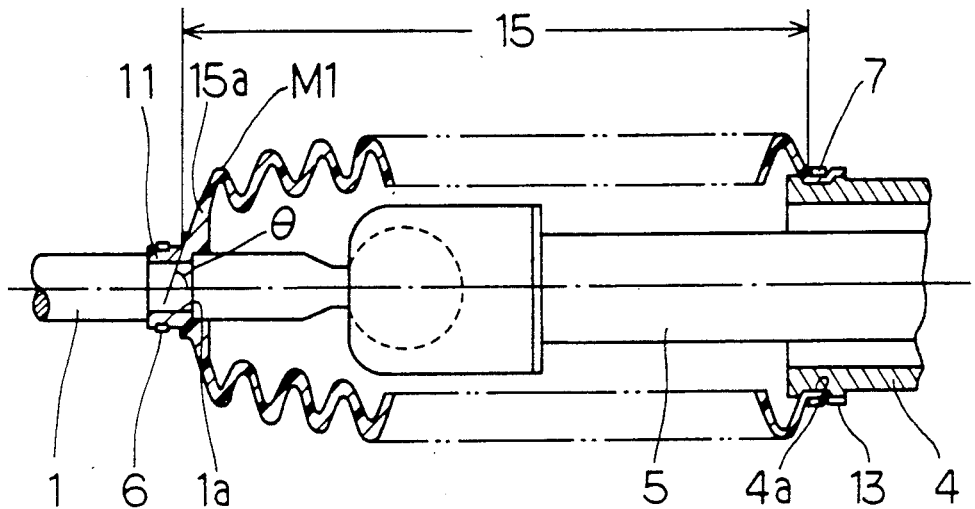
FIG. 1 is a cross-sectional view illustrating the state in which a conventional rack boot is installed.
Figure 2:
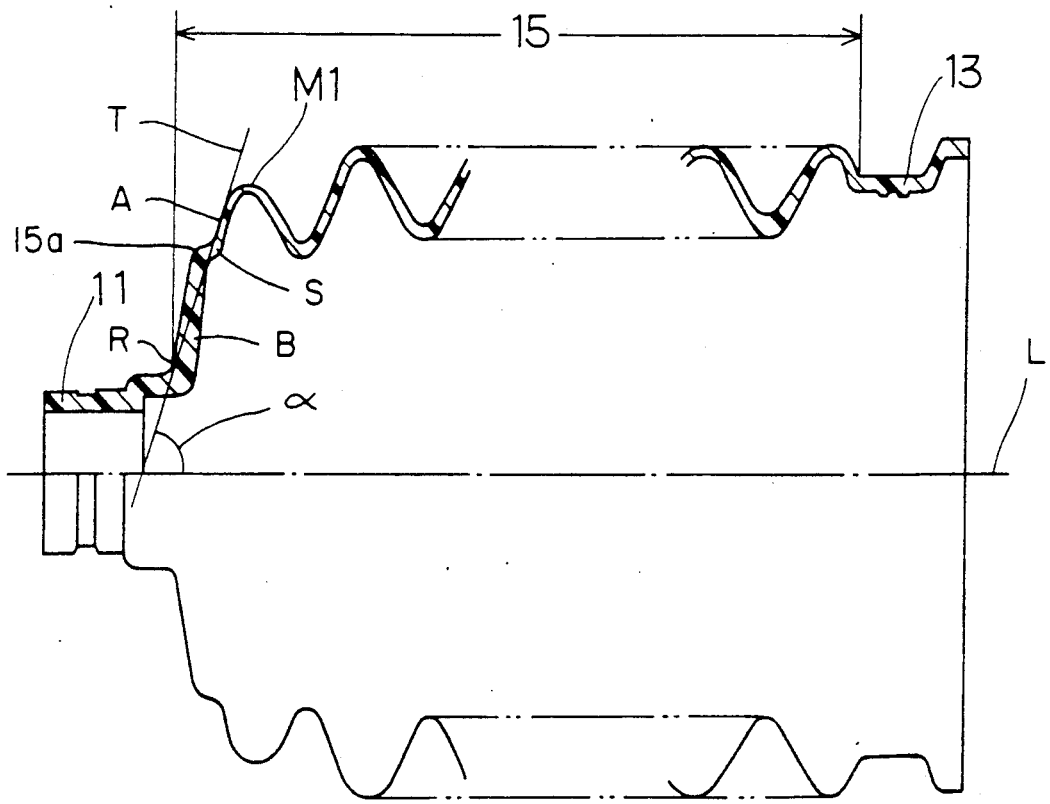
FIG. 2 is a partial cross-sectional view illustrating a half portion of a rack boot of an embodiment of the present invention.
Figure 3:
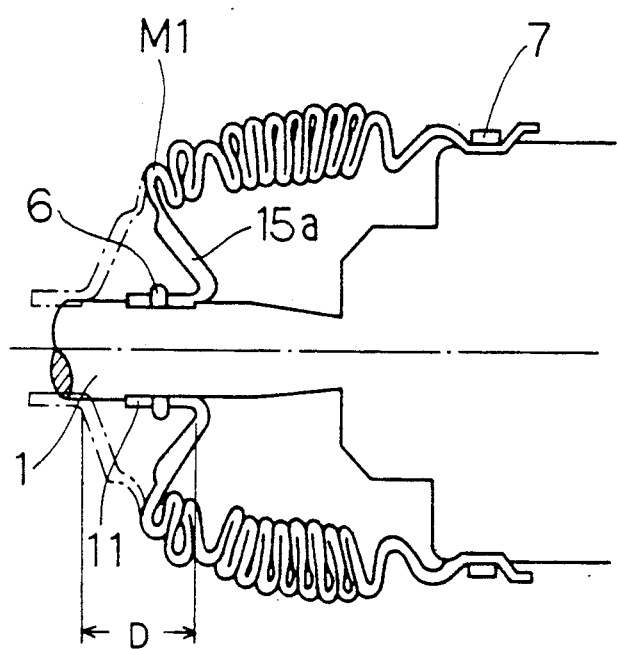
FIG. 3 is a sectional view of a rack boot of an embodiment of the present invention when compressed.

In FIGS. 2 and 3, an embodiment of a rack boot according to the present invention will now be described. The portions which are the same as those used in a conventional device are given the same reference number, and description of them is omitted. Reference number 5 represents a rack shaft, and reference numerals 6 and 7 represent metal fasteners for a small-diameter ring portion 11 and a large-diameter ring portion 13, respectively.

As shown in FIG. 2, a boot of this embodiment comprises, in a similar manner to a conventional boot, a small-diameter ring portion 11, a large-diameter ring portion 13, and a bellows portion 15 which is disposed between the two ring portions 11 and 13.

A slanted wall 15a of the first crest portion M1 which is closest to the small-diameter ring portion 11 in the bellows portion 15 has a step S toward the large-diameter ring portion 13 at an intermediate position thereof, and the thickness of a lower portion B below the step S is a thicker than that of an upper portion A above the step S. An angle $\alpha$ between an axial line L of the boot and a tangent T at a rounded root R of an upper surface of the lower portion B which touches an outer surface of the upper portion A is 70° to 85°.

The step S makes the first crest portion M1 turned in so that the first crest portion M1 overhangs to make a long rack stroke and reinforces the lower portion B as a bent flange. As the lower portion B is thicker and more rigid than the upper portion A, the lower portion B pushes the upper portion A efficiently to make the first crest portion M1 turned in. When the angle $\alpha$ is 70° or larger than 70°, the slanted wall 15a can be turned in easily. If the angle $\alpha$ exceed 85°, the effect of turning-in (the rack-stroke made by it) is small.

The boot is manufactured by injection blow forming or the like of a thermoplastic elastomer such as polyester, polyolefin, polyurethane, PVC or polyamid (Japanese Patent Laid-Open No. 160673/1986).

The boot is alternatively elongated (omitted from illustration) and contracted (see FIG. 3) in a substantially axial direction when a rack shaft 5 is reciprocated by a pinion (omitted from illustration). When the boot is contracted to an extreme extent, the slanted surface of the first crest, as shown in FIG. 3, is turned in. The first crest becomes overhand. In comparison with a conventional boot in which the slanted wall 15a thereof is not turned in, the boot according to the present invention can follow, as shown in FIG. 3, a surplus stroke D of the rack shaft 5 between the position shown by a dotted line and the position shown by the continuous line.

The following shrinkage ratios (elongated length/contracted length) were obtained using boots made by injection blow forming with common dimensions, namely outer diameter of the bellows portion: 64 mm; outer diameter of root portions of the belows portion: 48 mm; pitch of crests: 12.5 mm; number of crests: 12 the boot according to the present invention: ($\alpha = 80°$)

186 mm/44 mm = 4.23 the conventional boot: ($-\!-\!= 50°$)

194 mm/62 mm = 3.13

The former shows a very large shrinkage ratio.

What is claimed is:

1. A resin rack boot for installation at a steering rack portion of an automobile comprising:
   first and second rings, and
   a resin bellows interposed between said two rings and having a slanted wall with a lower portion adjacent said fist ring and an upper portion ending in a crest and wherein said lower portion is thicker than said upper portion,
   both of said lower and upper portions being slanted, said slanted wall having a step from said lower portion toward said second ring at a position dividing said lower and upper portions for permitting said first ring to move axially into said bellows, and wherein there is an angle of 70° to 85° between an axial line of said boot and a straight line which coincides with at least a point on an outer surface of said upper portion and at least a point on an outer surface of said lower portion.

* * * * *